United States Patent [19]

Ruigrok

[11] Patent Number: 4,669,015

[45] Date of Patent: May 26, 1987

[54] MULTIPLE GAP MAGNETIC READING HEAD

[75] Inventor: Jacobus J. M. Ruigrok, Eindhoven, Netherlands

[73] Assignee: U.S. Philips Corporation, New York, N.Y.

[21] Appl. No.: 719,191

[22] Filed: Apr. 3, 1985

[30] Foreign Application Priority Data

Apr. 9, 1984 [NL] Netherlands .................. 8401116

[51] Int. Cl.$^4$ ............................................. G11B 5/25
[52] U.S. Cl. ..................................... 360/119; 360/121
[58] Field of Search .................................. 360/119–121

[56] References Cited

U.S. PATENT DOCUMENTS

| | | | |
|---|---|---|---|
| 2,673,896 | 3/1954 | Rettinger | 360/121 |
| 3,098,126 | 7/1963 | Kaspaul | 360/120 |
| 3,143,603 | 8/1964 | Widener | 360/121 |
| 3,485,962 | 12/1969 | Barnes | 360/120 |
| 3,519,763 | 7/1970 | Lode | 360/120 |

Primary Examiner—Robert S. Tupper
Attorney, Agent, or Firm—F. Brice Faller

[57] ABSTRACT

A magnetic transducing head (1), for scanning a magnetic recording medium (14) which comprises a magnetizable surface (16) for retaining information in the form of a previously determined information pattern which is characterized by a restricted wavelength band, has a transducing gap (10) which is filled by a spacer consisting of a number ($\geq 4$) of layers (11) of a material of low magnetic permeability extending parallel to the core faces (6, 7) and forming sub-gaps, a layer (12) of higher permeability being interposed between every two successive layers (11) of low permeability. As a result of this the head (1) has a very high efficiency, while by adjusting in particular the spacings between the sub-gaps the head (1) can be given a desired band filter action.

9 Claims, 7 Drawing Figures

MULTIPLE GAP MAGNETIC READING HEAD

BACKGROUND OF THE INVENTION

The invention relates to a magnetic transducing head for scanning a magnetic recording medium which has a magnetizable surface for retaining information in the form of a previously determined magnetization pattern characterised by a restricted wavelength band. The head comprises a pair of core parts of magnetizable material having a high magnetic permeability, which core parts define a transducing gap between a pair of oppositely situated core faces. Eletromagnetic means is coupled to at least one of the core parts to produce an electric signal when a varying magnetic flux flows through the core parts.

Magnetic reading heads are used to convert magnetic signals into electric signals. Certain types of reading heads consist of an electromagnetic coupling means, for example a coil, which is coupled to a loop-shaped core of a magnetizable material which has a gap defined by a pair of opposite located core surfaces. A magnetizable storage medium, for example, a tape or disc having a magnetizable surface, is placed at such a distance from the reading head that coupling of magnetic flux with the gap area is possible. Magnetic stray flux of the medium ensures a magnetic coupling between the head and the medium. In the conventional reading heads there is one transducing gap which is filled with one non-magnetic spacer so that the gap has a high reluctance, which causes the stray flux of the medium to follow a path of lower reluctance through the core. Flux variations in the core are converted by the electromagnetic coupling means (the coil) into electric signals which represent the magnetic signals which are stored on the medium.

In modern (digital) systems for storing and reproducing information it may be advantageous to code the information in such manner that only a restrictive frequency band is used. The information on the medium then has the form of a restricted wavelength band. This wavelength band will in particular be in the range of very short wavelengths (<0.5 μm). A disincentive so far, to the use of such systems has been the requirement that in order to be able to read this inforrmation a reading head having a very short gap is necessary. Reading heads having a very short gap, however, have the disadvantage of a low efficiency and a high impedance.

SUMMARY OF THE INVENTION

It is the object of the invention to provide a magnetic reading head which is suitable for reading very short wave-signals of a previously determined, restricted wavelength band and yet has a good efficiency and low impedance.

According to the invention the transducing gap is filled by a spacer which consists of n layers of a material of a low magnetic permeability which extend parallel to the core faces and form sub-gaps, a layer of higher permeability being interposed between every two successive layers of low permeability, and $n \geq 4$.

The invention is based on the recognition of the fact that by a defined construction of the gap of the reading head from a number of magnetic layers separated from each other and from the core faces by magnetic insulators (respectively the poor magnetic transition between two magnetic layers or between a magnetic layer and a core face) a multiple gap reading head is formed having a previously determinable desired amplitude and phase characteristic. It is surprising that the efficiency increases with the number of gaps. The width of the overall gap configuration also determines the definition of the band filter characteristic. The interference which occurs between the signals which are read by the individual sub-gaps is essential. The gap spacings (and optionally gap lengths) in a simple embodiment of the reading head according to the invention are all chosen to be equal and adjusted so that for a signal having a wavelength equal to the central wavelength in the desired wavelength band so-called structural interference occurs. In a complicated embodiment the spacing between the sub-gaps are slightly varied so as to realize a reading head which passes a wider wavelength band than the reading head in the previous case. Although this is at the expense of a slightly smaller sensitivity at the central wavelength, the efficiency remains equal (with the same number of gaps).

The reading head according to the invention is suitable for reading recording media in which the information signal is recorded either in the longitudinal mode or in the perpendicular mode. A magnetic transducing system in which a number of reading gaps according to the invention are placed one behind the other, each gap being "tuned" to a different wavelength, will have for its advantage that, while maintaining the high efficiency and the low impedance—hence a very low signal-to-noise ratio—a wider frequency band can be transduced. It has been found that very good results are obtained when the reading head according to the invention satisfies the relationship:

$$\frac{1}{4} \leq \frac{\Sigma g}{g_e} \leq \frac{3}{4}$$

wherein $\Sigma g$ is the sum of the thicknesses of the layers of material of high magnetic permeability: $g_e$ is the effective width of the sub-gaps configuration as defined in the description.

DESCRIPTION OF THE PREFERRED EMBODIMENTS

Figure 1:
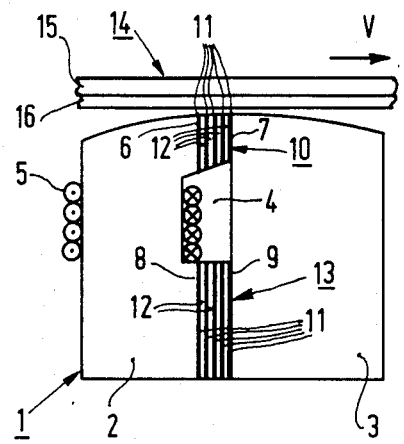
FIGS. 1–3 show different embodiments of a magnetic reading head having a five-fold gap.

FIG. 1 shows (in a cross-sectional view) a magnetic reading head 1 having a magnet core which is formed by two core parts 2 and 3, for example of ferrite. Core part 2 has a winding aperture 4 through which a coil 5 is wound. Oppositely located core faces 6, 7 and 8,9 are present on respective sides of the winding aperture 4. A transducing gap 10 is defined between the core faces (6, 7). Transducing gap 10 is filled with a spacer consisting of five layers 11 of a material having a comparatively low magnetic permeability, said layers being separated from each other by layers 12 of a material having a comparatively high magnetic permeability. A rear gap 13 is defined between the core faces 8 and 9. Rear gap 13 is filled with a spacer which has the same layer structure as the spacer of the transducing gap 10. The spacer in the rear gap 13 may consist of a single layer. This layer may be of a material having a comparatively low magnetic permeability (high reluctance) as a result of which the efficiency of the head 1 decreases slightly, or of a material having a comparatively high magnetic permeability (low reluctance). In the latter case the efficiency of the head 1 will slightly increase.

The layers 12 may consist of a sputtered Fe-Al-Si alloy, termed "Sendust", with 83.2 wt.% Fe, 6.2 wt.% Al and 10.6 wt.% Si, or of alloys on the basis of NiFe, CoFe, CoMn, AlFe.

Figure 4:
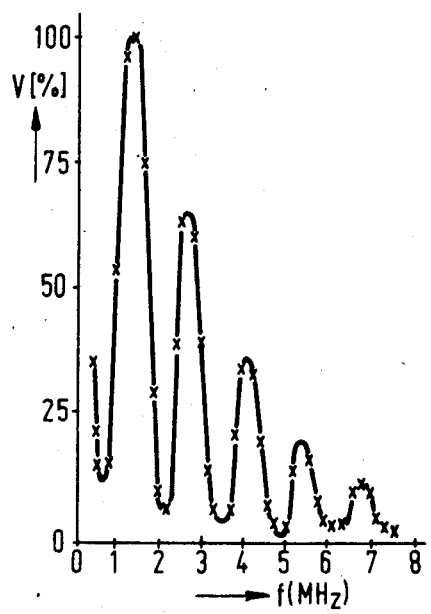
FIG. 4 shows an experimentally measured frequency characteristic of a magnetic reading head having a three-fold gap.

The layers 11 may be of glass or of a non-magnetic metal. The layers 11 adjoining the core faces 6 and 7 may also be formed by transistion areas of the core parts 2 and 3 adjoining the core faces and showing a reduced magnetic permeability. The frequency characteristic of a head having a triple gap in which the outermost sub-gaps have a length of 0.07 $\mu$m, the central gap has a length of 0.2 $\mu$m and the two highly permeable layers between which the central gap is defined have thicknesses of 2.03 and 2.16 $\mu$m, has been measured experimentally. The head was used to read a signal written on magnetic tape 14, consiting of a carrier 15 and a magnetic coating 16, by means of a conventional (single gap) writing head. The tape 14 was moved past the head at a rate of 3.14 m/sec in the direction v. FIG. 4 shows the resulting frequency characteristic. The output voltage V of the head 1 at which the highest measured output voltage is indicated by 100% is plotted vertically. The frequency f in MHz is plotted horizontally. Dips occur in the output voltage which are at most 10% of the peak values. A multiple gap reading head thus is sensitive to signals which are in certain previously determinable frequency bands. The efficiency of the head having a 3-fold gap is higher in the passed freuqency (wavelength) band than the efficiency of a single gap head whose gap has such a gap length as to be suitable to read the signals of very short wave-lengths. For effects which are useful in practice it has been found that the number of sub-gaps must be four or higher. As the number of sub-gaps increases, the efficiency increases; the efficiency of a reading head having a 9-fold transducing gap (sum the lengths of transducing gaps 0.5 $\mu$m) upon reading short-wave signals of a wavelength of 0.2 $\mu$m is approximately four times as high as the efficiency of a reading head having a single transducing gap of a length of 0.08 $\mu$m.

Figure 2:
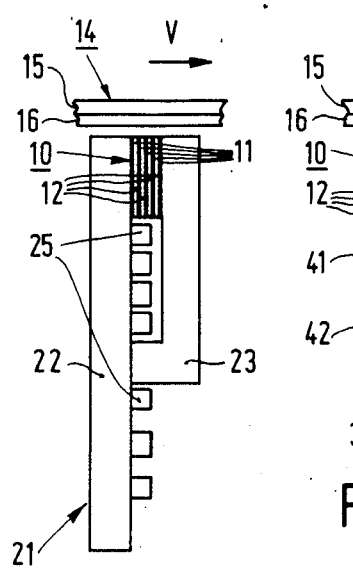
Figure 3:
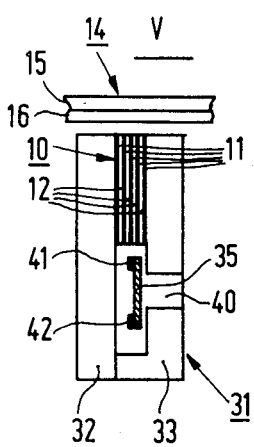

FIG. 2 shows a thin-film head 21 which in the same manner as reading head 1 of FIG. 1 comprises a transducing gap 10 which is constructed from a number of sub-gaps 11 separated from each other by magnetic layers 12. The thin-film head 21 further consists of a first and second layer 22 and 23 of a magnetizable material which are connected together at a point remote from the transducing gap 10. The layer structure is completed by a coil 25 which serves as an electromagnetic coupling means. An alternative electro-magnetic coupling means is a magnetoresistive element. The head 31 (thin-film) head shown in FIG. 3 is formed by a first and a second layer (32 and 33) of a magnetizable material between which a transducing gap 10 is defined constructed from sub-gaps separated from each other by magnetic layers 12. An aperture 40 is provided in layer 33. Magneto-resistive element 35 is positioned with respect to the aperture 40 in such manner as to present a path of lower reluctance than aperture 40 to the magnetic flux flowing through the thin-film head 31. Magneto-resistive element 35 comprises electric contacts 41 and 42 for the connection thereof to an electric reading circuit.

Each of the heads 1, 21 and 31 has a higher efficiency than a single gap reading head having a gap length $g_o$ which is so short that the head is sensitive to the same wavelengths as the heads 1, 21 and 31. The efficiency increases with increasing number of sub-gaps of the gaps 10. If the gap lengths are equal the following relationship applies to a good approximation:

$$\eta_n = \frac{n\eta_1}{1 + \eta_1(n-1)/\eta_{int}}$$

wherein $\eta_n$ is the efficiency of a reading head having an n-fold gap and $\eta_{int}$ is the internal efficiency.

The internal efficiency is the finite efficiency (0.7~0.9) of a head having a very large gap length and is caused by the magnetic potential drop in the head as a result of the leakage flux flowing through it.

With unequal lengths of the sub-gaps the more general relationship holds:

$$\eta_\Sigma \neq \frac{(\Sigma g) \eta_o}{g_o + \eta_o((\Sigma g) - g_o)/\eta_{int}}$$

wherein $\eta_\Sigma$ is the efficiency of a reading head having an overall length of the sub-gaps $\Sigma$ g.

$\eta_o$ is the efficiency of a reading head having the gap length $g_o$.

Figure 5:
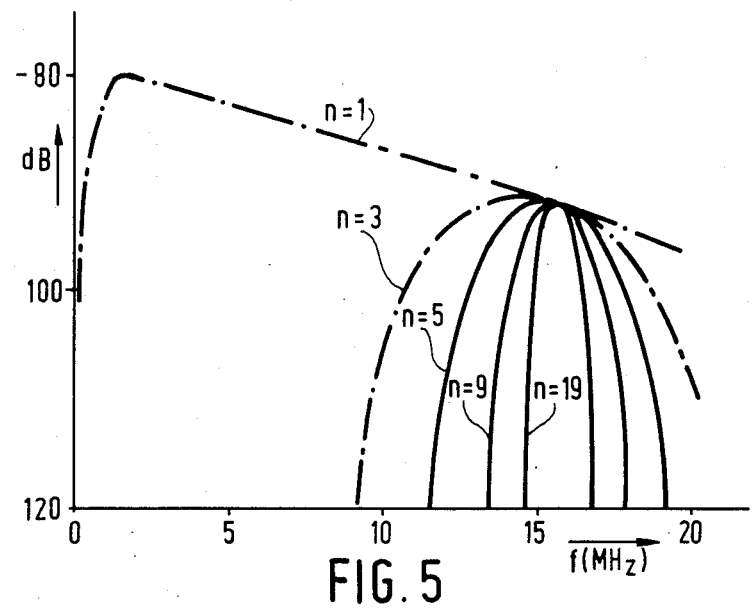
FIG. 5 shows calculated frequency characteristics of magnetic reading heads having an n fold gap (n=1, 3, 5, 9 and 19, respectively)

A computed example of reading heads having 1, 3, 5, 9 and 19-fold tranducing gaps is given by the frequency characteristics shown in FIG. 5. Only the relevant part of each frequency characteristic is shown.

The band filter characteristic becomes more significant according as the number of sub-gaps increases.

Parameters used for the calculations: (see Table I).

TABLE I

| locations [$\mu$m] | gap lengths in [$\mu$m] for number of gaps n = | | | | |
| --- | --- | --- | --- | --- | --- |
| | 1 | 3 | 5 | 9 | 19 |
| −1.8 | | | | | 0.01 |
| −1.6 | | | | | 0.02 |
| −1.4 | | | | | 0.03 |
| −1.2 | | | | | 0.04 |
| −1.0 | | | | | 0.05 |
| −0.8 | | | | 0.02 | 0.06 |
| −0.6 | | | | 0.04 | 0.07 |
| −0.4 | | | 0.033 | 0.06 | 0.08 |
| −0.2 | | 0.05 | 0.066 | 0.08 | 0.09 |
| 0.0 | 0.10 | 0.10 | 0.10 | 0.10 | 0.10 |
| 0.2 | | 0.05 | 0.066 | 0.08 | 0.09 |
| 0.4 | | | 0.33 | 0.06 | 0.08 |
| 0.6 | | | | 0.04 | 0.07 |
| 0.8 | | | | 0.02 | 0.06 |
| 1.0 | | | | | 0.05 |
| 1.2 | | | | | 0.04 |
| 1.4 | | | | | 0.03 |
| 1.6 | | | | | 0.02 |
| 1.8 | | | | | 0.01 |
| $\Sigma_g$ [$\mu$m] | 0.10 | 0.20 | 0.30 | 0.50 | 1.00 |
| $\eta$ Ferrite* | 0.133 | 0.23 | 0.30 | 0.40 | 0.53 |
| Improvement $\eta$ Ferrite with respect to Ferrite | | 6.4 | 8.7 | 11 | 13.6 |

TABLE I-continued

| locations [μm] | gap lengths in [μm] for number of gaps n = | | | | |
|---|---|---|---|---|---|
| | 1 | 3 | 5 | 9 | 19 |
| head with $g_o$ = 0.08, in [dB] | | | | | |
| η TFH+ | 0.038 | 0.07 | 0.100 | 0150 | 0.24 |
| Improvement η TFH with respect to TFH with $g_o$ = 0.08, in [dB] | | 7.4 | 10.5 | 14 | 18 |

Remarks:
*the efficiency computations are started from the assumptions that if the gap length $g_{ref}$ = 0.3 μm the ferrite head at 15 MHz has an efficiency $\eta_{ref}$ = 0.3 and has an internal efficiency of 0.8.
+For the thin-film head (TFH) construction the computations are started from the assumption that the efficiency at 15 MHz is lower. In this case values of $\eta_{ref}$ 0.1 if $g_{ref}$ = 0.3 μm, and $\eta_{int}$ = 0.6 havebeen used.

In FIG. 5, −80 dB on the vertical axis corresponds to 100 μV.

The computed example was started from the following data:

Writing head of Sendust or of ferrite with gap faces coated with Sendust, writing gap length 0.15 μm.

Head-tape spacing both for writing and reading 0.02 μm.

Recording medium: vapour-deposited metal tape with $H_c$=66 KA/m, $B_s$=0.38 T, $\mu_r$=1.75 and coating thickness is 0.16 μm.

The model, with which the band filter characteristics of FIG. 5 have been calculated, provides for n=3 a curve which coincides at least substantially with the experimentally measured curve of FIG. 4 when the same parameters as in the measured head are used.

The shape of the band filter characteristic can be adjusted at will.

In particular the drop in the amplitude characteristic as a result of the head-tape spacing losses during writing and reading and as a result of gap losses can be compensated for.

Figure 6:
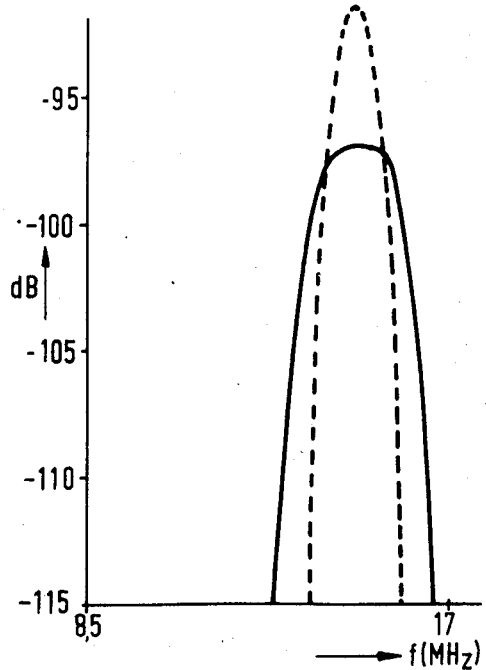
FIG. 6 shows the calculated frequency characteristics of two different reading heads having a 19-fold gap.

In a reading head having a 19-fold gap in FIG. 6 a filter action has been obtained, by means of a suitable choice of gap length variations and gap spacing variations, having a more rectangular passband than in the examples of FIG. 5, in which the approximately 1.5 dB/MHz decline as a result of gap and spacing losses has also been compensated for. For comparison, the frequency characteristic of a reading head having a 19-fold gap with fixed gap spacings is shown in broken lines. This characteristic can be found again in FIG. 5. The flattening has been obtained by constructing the "filter" from essentially 3 filters with central frequencies at 13.9, 14.7 and 15.7 MHz. This has been reached by choosing the spacings between the gaps of the individual filters to be 0.86, 0.64 and 0.60 μm, respectively.

The parameters are shown in the table for FIG. 5. The gap configuration is indicated in the following table:

TABLE II

| Gap length μm | Location μm |
|---|---|
| 0.010 | −1.800 |
| 0.012 | −1.813 |
| 0.027 | −1.493 |
| 0.040 | −1.200 |
| 0.030 | −1.333 |
| 0.054 | −0.853 |
| 0.070 | −0.600 |
| 0.048 | −0.453 |
| 0.081 | −0.213 |
| 0.100 | 0.000 (central gap) |
| 0.054 | 0.227 |
| 0.072 | 0.427 |
| 0.070 | 0.600 |
| 0.036 | 0.907 |
| 0.045 | 1.067 |
| 0.040 | 1.200 |
| 0.018 | 1.587 |
| 0.018 | 1.707 |
| 0.010 | 1.800 |

Figure 7:
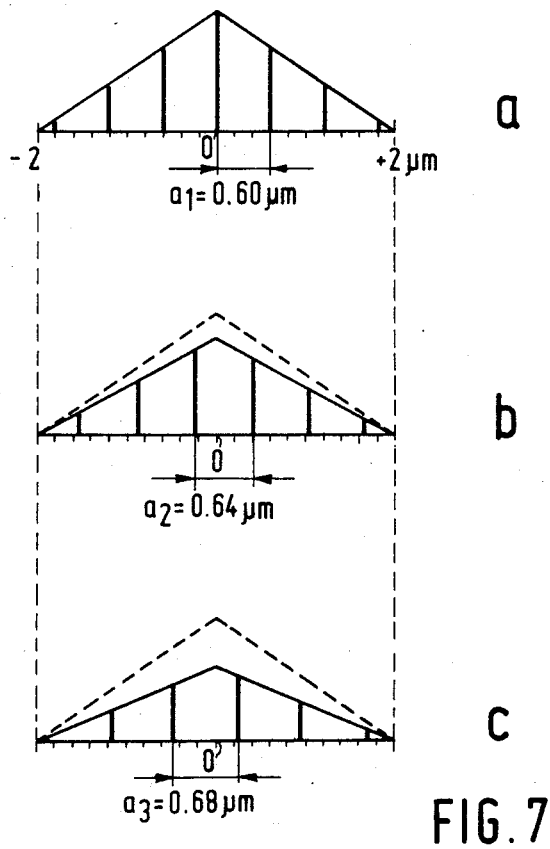
FIG. 7 shows three different sub-gap configurations in a diagram form.

In FIG. 7 the gap configuration of the band filter head thus composed is divided into the three individual filters. The heights of the lines indicate the gap lengths. The frequencies 13.9, 14.7 and 15.7 mHz correspond to the third "harmonics" of the individual filters.

For example in a band filter head consisting of essentially n of such individual filters at the passband is preferably tuned to the $n^{th}$ "harmonic" of the individual filters corresponding to the first "harmonic" of the composed filter.

The broken line in FIG. 6 indicates the non-flattened curve of a 19-fold gap configuration having gaps at mutually equal distances a=0.213 μm.

The efficiencies of the two heads are substantially equal ($\eta_{ferrite} \approx 0.5$; $\eta_{TFH} \approx 0.2$) and have thus been improved to the same extent as the efficiency of the 19-fold gap head in FIG. 5 which corresponds substantially to the broken line curve. The drop compensation of approximately 1.5 dB/MHz has been obtained by giving the highest tuned filter (with $a_1$=0.60 μm) both the largest number of gaps (7 instead of 6) and the largest gap length (see FIG. 7). The central filter also has slightly larger gap lengths.

In this example a straight phase characteristic has been chosen which has been obtained by giving the head as shown in FIG. 7 a symmetrical gap configuration. Non-symmetrical gap configurations lead to non-linear phase characteristics.

Another aspect is that the definition of the band filter characteristic at a constant spacing a between the sub-gaps is determined to a considerable extent by the effective length $g_e$ of the gap configuration. This is defined as:

$$g_e = a(\Sigma g)/g_{max},$$

wherein
a is the spacing between the sub-gaps,
Σ g is the sum of the gap lengths, and
$g_{max}$ is the largest gap length.

It has been found that magnetic reading heads according to the invention show a particularly usable filter action if the gap lengths are chosen to be in a certain range. This range may be indicated as $$\frac{1}{4} \leq \frac{\Sigma g}{g_e} \leq \frac{3}{4}.$$

What is claimed is:
1. A magnetic transducing head, for scanning a magnetic recording medium which has a magnetizable surface for retaining information in the form of a magnetization pattern characterized by a restricted wavelength band, comprising:
a pair of core parts of a magnetizable material having a comparatively high magnetic permeability, which core parts have respective oppositely lo- cated core faces which define a transducing gap therebetween;

electromagnetic means coupled to at least one of the core parts to produce an electric signal when a varying magnetic flux flows through the core parts;

a spacer filling the transducing gap, the spacer comprising at least four layers of a material of a low magnetic permeability, which layers extend parallel to the core faces and form sub-gas, a layer of higher permeability being interposed between every two successive layers of low permeability, each layer of higher permeability defining the spacing between sub-gaps, said spacings being of unequal length.

2. A magnetic transducing head as claimed in claim 1, characterized in that the lengths of the sub-gaps are equal.

3. A magnetic transducing head as claimed in claim 1, characterized in that the lengths of the sub-gaps are unequal.

4. A magnetic head as claimed in claim 1, characterized in that the sub-gaps include at least two groups of sub-gaps, the sub-gaps of each group having equal spacings, the sub-gap spacings of different groups being different.

5. A magnetic transducing head, for scanning a magnetic recording medium which has a magnetizable surface for retaining information in the form of a magnetization pattern characterized by a restricted wavelength band, comprising a pair of core parts of a magnetizable material having a comparatively high magnetic permeability, which core parts have respective oppositely located core faces which define a transducing gap therebetween;

electromagnetic means coupled to at least one of the core parts to produce an electric signal when a varying magnetic flux flows through the core parts;

a spacer filling the transducing gap, the spacer comprising at least four layers of a material of a low magnetic permeability, which layers extend parallel to the core faces and form sub-gaps of unequal length, a layer of higher permeability being interposed between every two successive layers of low permeability, each layer of higher permeability defining the spacing between sub-gaps.

6. A magnetic transducing head as in claim 5 wherein there are n layers of said material of low magnetic permeability; n is an odd number, thereby defining a central sub-gap; said central sub-gap being longer than sub gaps to either side.

7. A magnetic head as claimed in claim 5, characterized in that the sub-gaps include at least two groups of sub-gaps, the sub-gaps of each group having equal spacings, the sub-gap spacings of different groups being different.

8. A magnetic transducing head as in claim 5 wherein the spacing between successive sub-gaps is substantially equal.

9. A magnetic transducing head as claimed in claim 8, characterized in that it holds that $$\frac{1}{4} \leq \frac{g}{g_e} \leq \frac{3}{4}$$

wherein $\Sigma g$ is the sum of the lengths of the sub-gaps, and $$g_e = \frac{a(\Sigma g)}{g_{max}}$$

wherein a is the spacing between the sub-gaps, a=constant; and $g_{max}$ is the largest sub-gap length.

* * * * *